United States Patent
Korpi

(10) Patent No.: US 6,640,929 B2
(45) Date of Patent: Nov. 4, 2003

(54) TRUCK TAILGATE AUXILIARY LADDER

(75) Inventor: John G. Korpi, Livonia, MI (US)

(73) Assignee: The United States of America as represented by the Secretary of the Army, Washington, DC (US)

(*) Notice: Subject to any disclaimer, the term of this patent is extended or adjusted under 35 U.S.C. 154(b) by 0 days.

(21) Appl. No.: 10/118,614

(22) Filed: Apr. 5, 2002

(65) Prior Publication Data

US 2003/0188925 A1 Oct. 9, 2003

(51) Int. Cl.[7] .................................................. E06C 5/00
(52) U.S. Cl. ...................................................... 182/127
(58) Field of Search ........................ 182/127, 91, 106, 182/97; 280/166; 296/62

(56) References Cited

U.S. PATENT DOCUMENTS 3,545,567 A * 12/1970 Dohrman ..................... 182/97
3,563,342 A *  2/1971 Lasiter ........................ 182/97
5,046,582 A *  9/1991 Albrecht ..................... 182/127

* cited by examiner

Primary Examiner—Alvin Chin-Shue
(74) Attorney, Agent, or Firm—David L. Kuhn; Gail S. Soderling; Clifford C. Carter

(57) ABSTRACT

An auxiliary ladder is disclosed which can be stored as part of the tailgate of a large truck. The ladder can be rotated into position with its lowest step into ground and a handle deployed to allow easy access to and from the elevated bed of truck.

1 Claim, 3 Drawing Sheets

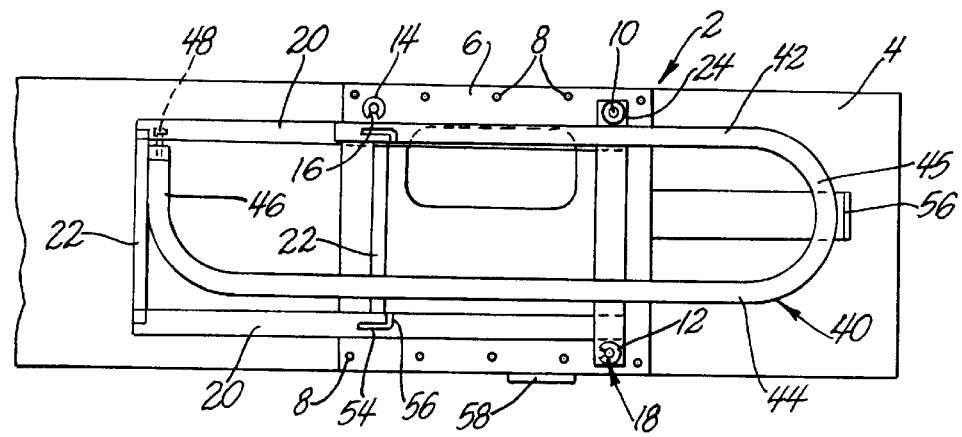
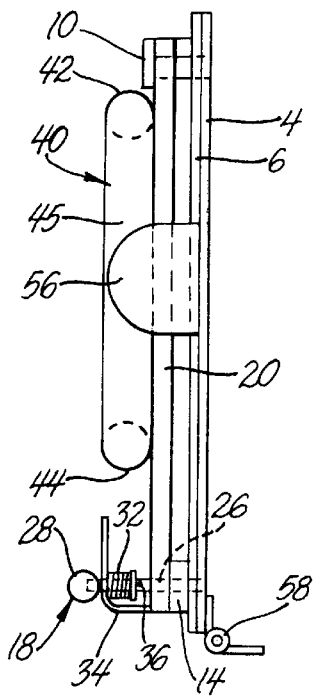
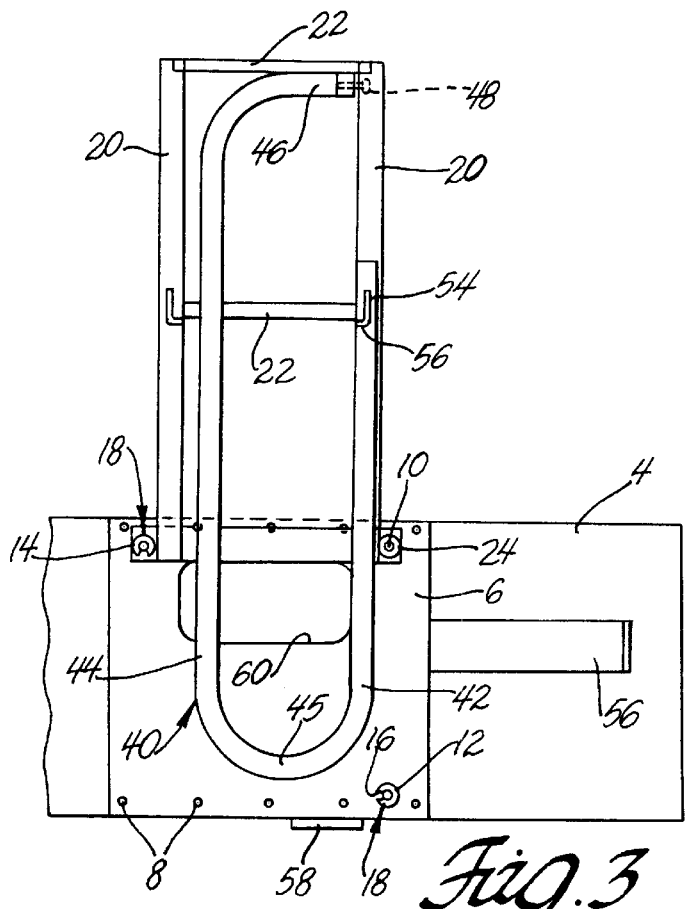

TRUCK TAILGATE AUXILIARY LADDER

GOVERNMENT INTEREST

The invention described herein may be made, used and licensed by and for The United States for governmental purposes without paying me any royalty.

BACKGROUND OF THE INVENTION

In one aspect this invention relates to tailgate structures useful with large trucks. In a further aspect, this invention relates to an improved ladder structure for use with large trucks to facilitate ingress and egress by personnel from the vehicle.

Military cargo vehicles are also used to carry troops. These cargo vehicles are made in a wide variety of sizes and configurations to meet various needs and because the military must operate off road over very rough terrain, the axles and cargo bed are usually a substantial distance from the ground This makes it impossible for a person to enter the vehicle from ground level without at least one assisting step.

Presently the most common assisting step at the rear of a military cargo vehicle is a bracket extending above the tailgate used as a combination handle and step when the tailgate is lowered, troops or personnel entering the vehicle can step onto the bracket and then onto the cargo bed. This configuration has problems. First the bracket/step is generally a substantial height from the ground when the tailgate is lowered. This makes it difficult for many persons, particularly shorter persons to use the step. Also, the second step from the bracket onto the cargo bed is substantial in most cases. These problems are compounded by the fact that troops are frequently required to enter carrying battle gear which may weigh 100 pounds or more. This additional weight is not evenly distributed on their body and negatively effects balance. The resulting bracket structure slows the passage of persons from the truck, increases the chances for an accident, and increases exposure to weapons fire under battlefield conditions.

It would be desirable to have a ladder structure associated with the existing vehicle tailgate structure to provide additional steps when the tailgate is lowered and which can be stored on the tailgate when the tailgate is in its upright position.

SUMMARY OF THE INVENTION

The present invention relates to a ladder structure, for use with a cargo truck having a raised cargo bed with a tailgate, to improve ingress and egress of people to the cargo bed. The ladder structure has a bracket rigidly mounted to the tailgate with a mounting stud bond one corner of the bracket for mounting the ladder structure. The bracket also has first and second retention bosses, the bosses being located on the bracket a predefined distance from the mounting stud. The bracket may also have an aperture formed in the center portion to provide a more defined step for use by persons when they use the ladder.

The ladder structure attached to the rectangular bracket, has a pair of spaced, parallel side rails, and a plurality of rungs attached to and disposed between the side rails. A bearing is formed on one end of the ladder near one of the side rails and the bearing journaled on the stud. This bearing rotatably attaches one end of the ladder to the rectangular bracket in a manner that allows rotation of the ladder through an arc of about 90 degrees.

A detent, adapted to engage the retention bosses, is mounted on the same end of the ladder as the bearing but near the side rail opposite the bearing. The detent engages the first slotted retention boss to hold the ladder in a storage position when the tailgate is up for vehicle movement. When the ladder is rotated to a vertical position, the second slotted retention boss is engaged by the detent to hold the ladder in the deployed position.

The ladder has a handle with first and second parallel arms joined by a curved connector. The first parallel arm of the handle is coaxially mounted within one of the side rails, the first arm being free to move longitudinally with respect to the ladder rail. The second arm of the handle has a curved extension on the end of the second arm opposite the curved connector, the curved extension being directed towards the first arm. The curved extension has a headed protrusion that engages a complementary slot formed in the first ladder side rail. The slot has an offset depression associated therewith, the depression adapted to hold the head of the protrusion when the handle is in an upright position.

BRIEF DESCRIPTION OF THE DRAWINGS

In the accompanying drawing:

FIG. 1 is a view of a truck tailgate from inside the truck with a ladder structure of this invention in the stored position;

FIG. 2 is a side view of FIG. 1;

FIG. 3 is a rear view of the truck tailgate from inside the truck with the ladder rotated preparatory to opening the tailgate

DETAILED DESCRIPTION

Figure 6:
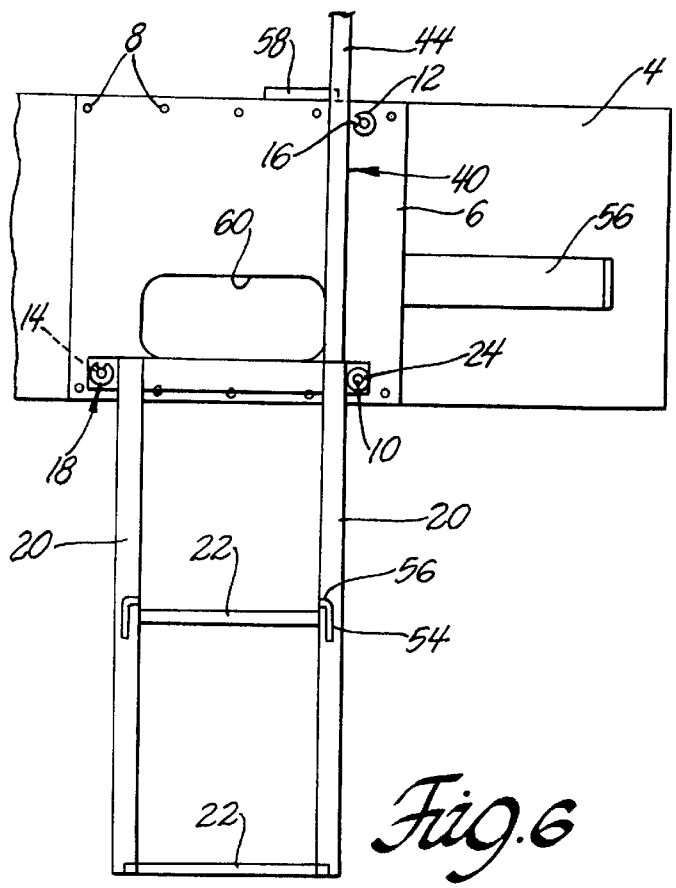
FIG. 6 shows the handle rotated in the extended position to temporarily lock it in place
Figure 8:
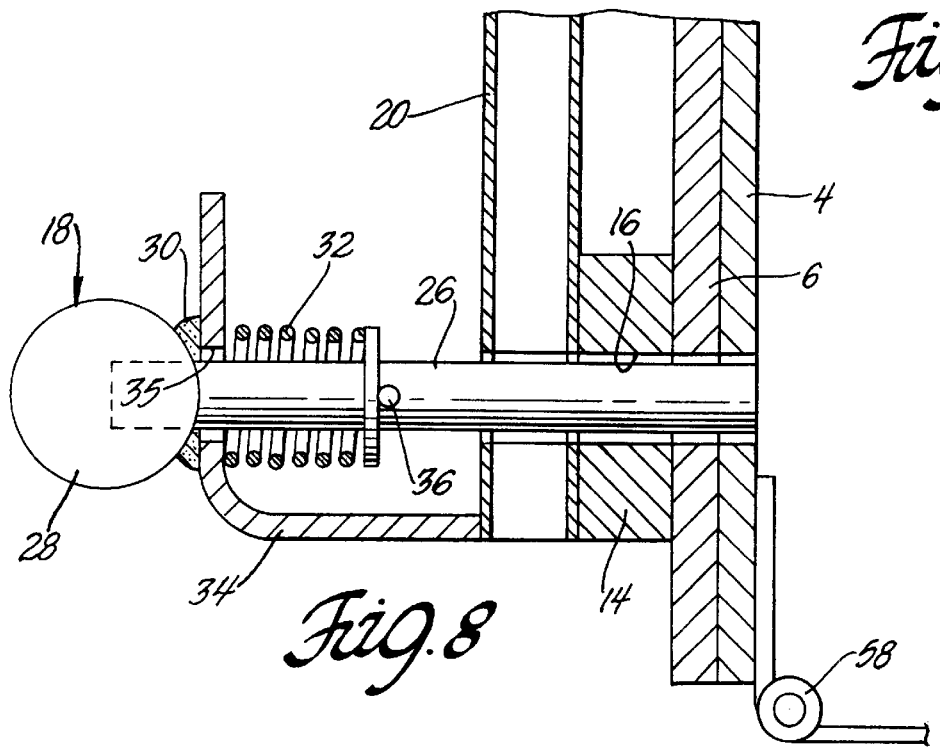
FIG. 8 is a detailed view of a holding pin for retaining the ladder in the desired position.

Referring to the accompanying drawing wherein like numerals refer to like parts, and initially to FIGS. 1 and 2, a deployable ladder structure 2 according to this invention, is depicted for use with a truck (not shown) having a tailgate 4. The ladder 2 in its deployed position will improve the ease of ingress and egress of persons into and out of the truck. The ladder structure 2 has a bracket 6 rigidly mounted to tailgate 4, by means of a plurality of fasteners 8 such as bolts or rivets. The bracket 6 is shown as a rectangular plate and has a stud 10 located on one corner. A first slotted retention boss 12 is located on the bracket 6 a predetermined distance vertically away from the stud 10. A second slotted retention boss 14 is located an equal predetermined distance horizontally from stud 10 the slotted retention bosses 12, 14 providing anchor points for the ladder in both a storage position as shown in FIG. 1 and a deployed position as shown most fully in FIG. 6. The retention bosses 12, 14 each have a slot 16 formed so as to receive a spring loaded pin 18, shown in detail in FIG. 8 and described in detail below. There is an aperture formed in bracket 6 at the root of each slot 16 into which the pin 18 can mate to hold the ladder firmly in position during transport and use. When spring loaded pin 18 is retracted for disengaged from the bracket 6 at one slotted retention boss, the ladder structure 2 can rotate about the stud 10 moving the spring loaded pin towards the other slotted retention boss. The slot 16 will guide the spring-loaded pin-into position with and alignment to the corresponding aperture for that boss. The ladder portion of the invention is formed by a pair of spaced, parallel side rails 20 and a plurality of rungs 22 attached to and disposed between the side rails. The rungs 22 serve to hold the side rails 20 in a spaced parallel configuration. As shown, rungs are formed of square metal tubing welded to the side rails 20. However, other normal ladder step configurations such as flat steps with and in boss traction pattern could also be used.

A bearing 24 is located on one end of the ladder near one of the side rails 20, the bearing being affixed to and journaled on stud 10. This structure rotatably mounts one end of the ladder 2 to the bracket 6 and allows easy rotation of the ladder through an arc of about 90 degrees which allows storage of the ladder longitudinally with respect to the tailgate for travel and for deployment orthogonally to the tailgate for usage.

The spring loaded pin 18 operates as a detent which can engage the first and second retention bosses 12, 14. The spring-loaded pin is mounted as shown in detail by FIG. 8 on one side rail 20 opposite the bearing 24 and on the same end of the ladder as the bearing. The spring loaded pin 18 has a shaft 26 which operates as a detent to engage the slots 16 formed in retention bosses 12, 14. The spring loaded pin 18 has a head 28 with an associated flared collar 30 and a spring 32. The entire assembly is mounted to the ladder side rail 20 using an L-shaped bracket 34 with shaft 26 extending through an aperture 35 formed in one leg of the bracket. A pin 36 transversely extending through the shaft 26 retains the spring 32 in position between L-shaped bracket 34 and the shaft, biasing the shaft 26 towards the mounting bracket 6. The shaft 26 in its normal holding position will extend through two apertures in the ladder rail 20, the slot in the slotted retention bosses 12, 14 and an aperture in the bracket 6. In this position the shaft holds the ladder in position and prevents rotation. The head 28 can be grasped and the shaft 26 retracted against the force of spring 32 to disengage the shaft from the bracket 6 and allow the ladder to be rotated about shaft 10 on bearing 24 to rotate the ladder between the storage and the deployed position. The retention bosses 12, 14 allow rotation through about 90 degrees, the slots in retention bosses determine the direction of rotation and serve to engage the shaft 28 and guide it to the proper alignment with the complementary apertures in bracket 6.

When the spring loaded pin 18 is engaged with boss 12, the ladder is held in its storage position parallel to the longitudinal axis of the tailgate as shown in FIG. 1 and 2. When the ladder is rotated and the spring loaded pin 18 engages the second slotted retention boss 14, the ladder is held in the deployed position which is orthogonal to the longitudinal axis of tailgate 4. The bosses to 12, 14 can be depicted as located on an arc with the radius equal to the distance between the stud 10 and the center of the bosses with the opening of the slots in each boss being formed on the arc and facing the other boss. The deployment cycle is shown in FIGS. 3–6 and will be described in detail below.

Figure 7:
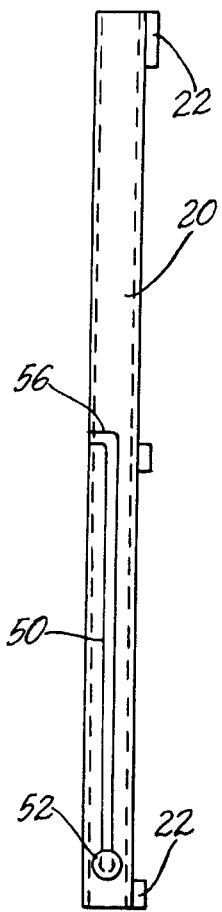
FIG. 7 is a view of the ladder side rails.

The ladder structure 2 has a handle 40 with first and second parallel arms 42, 44 respectively, joined by a semi-circular connector 45. The first parallel arm 42 is coaxially mounted within one of the side rails 20 and can move freely longitudinally with respect to the side rail to move the handle from the storage position to the deployed position. The second arm 44 has a curved bail 46 attached to the end of the arm opposite the semicircular connector which extends towards the first ladder side rail and terminates near that rail. The curved bail 46 has a headed protrusion 48 that extends through and engages a slot 50, shown in FIG. 7, formed in the ladder side rail 20 which also holds the first arm of the handle 40. The slot 50 has an aperture 52 formed in the ladder side rail 20 into which the head 49 of the protrusion 48 is fitted. The slot 50 has an associated offset depression 54 and a communicating channel 56 which allows the protrusion 48 to be moved along the slot 50 and the handle 40 rotated to move the protrusion into the offset depression 54. Gravity will hold the protrusion 48 in the offset depression 54 when the handle 40 is in its deployed, upright position, the depression maintaining the handle in position and preventing rotation of the handle 40.

A retention member 56 is provided to hold the semicircular connector 45 portion of the handle 40 when the ladder structure 2 is being stored. The retention member 56 can be of various sorts such as a cantilevered arm or a strap that surrounds the semicircular connector and is fastened to bracket 6.

Operation of the ladder system starts in FIG. 1, the storage position. In the storage position the ladder structure 2 is longitudinally aligned with the axis of the tailgate 4. The spring loaded pin 18 is engaged with the first slotted retention boss 12 holding that the ladder firmly in the longitudinal position during operation of the vehicle. The handle 40 is held in place by retention member 56.

When it is desired to load personnel, spring loaded pin 18 is retracted, and the ladder rotated about the stud 10 to a vertical position as shown in FIG. 3 and spring loaded pin 18 inserted into A the retention boss 14. This a places the ladder structure 2 in a vertical position with respect to the ground and the tailgate 4 will be rotated about hinges 58 dropping the tailgate and the ladder into the position shown in FIG. 4. In this position the lowest rung called the ladder will be near the ground and the ladder will depend vertically from the bottom of the tailgate 4.

Figure 4:
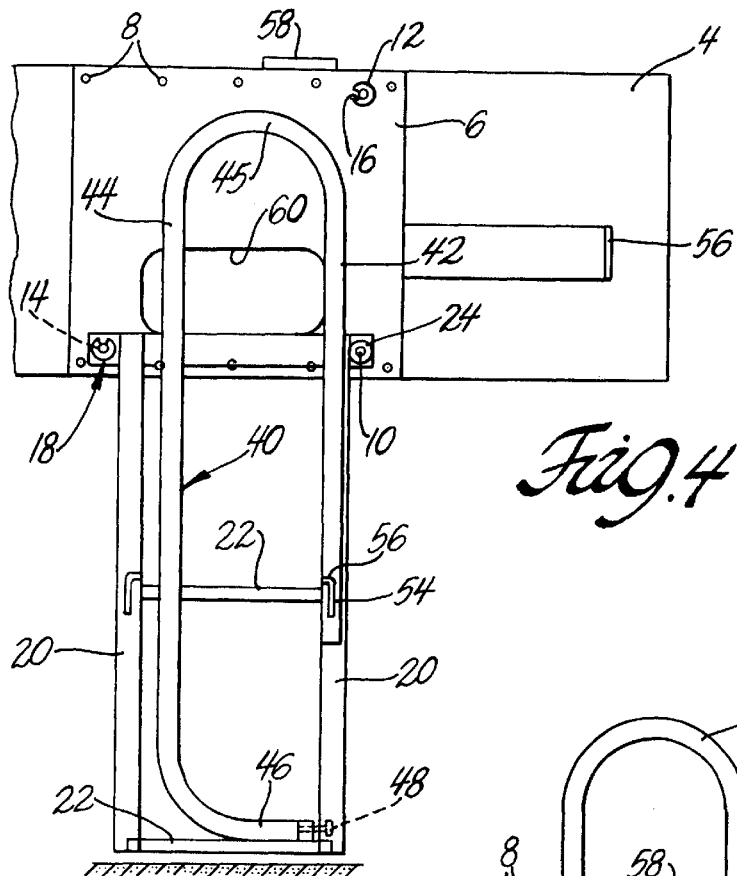
FIG. 4 is a view facing the truck from outside with the tailgate in the open and down.
Figure 5:
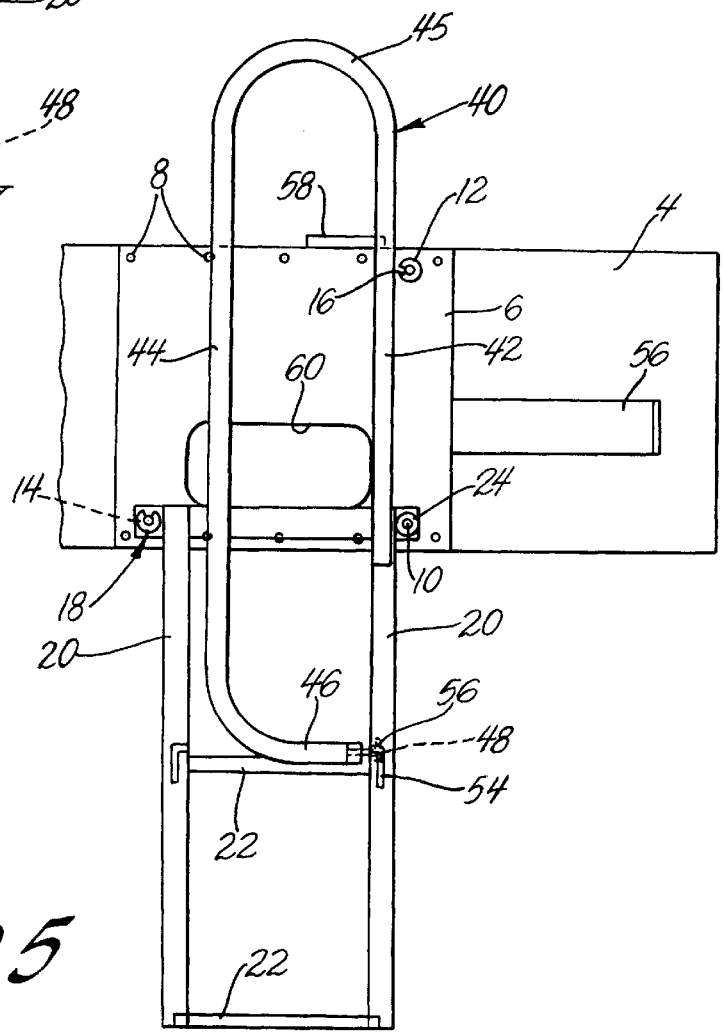
FIG. 5 shows the handle moved upward to its extended position.

To position the handle 40, the handle is moved vertically so the protrusion 48 moves along the slot 50 until it reaches the communicating channel 56 as shown in FIG. 5 at which time the handle is rotated approximately 90 degrees away from the truck until the protrusion can engage the offset depression 54 which allows the protrusion to drop slightly where gravity will act to hold the handle. The protrusion is held by the offset depression 54 providing stability to the handle and extending the handle above the truck bed. In this position personnel entering or exiting the vehicle will have a reasonable size step and continuous handhold to negotiate while bearing standard army equipment. As shown in the figures, the bracket 6 has been provided with a rectangular aperture 60 so that the boot or shoe of personnel entering or exiting the vehicle will have additional space with which to engage the upper rung of the ladder structure.

Various alterations and modifications will become apparent to those skilled in the art without departing from the scope-and spirit of this invention and it is understood this invention is limited only by the following claims.

What is claimed is:

1. A ladder structure, for use with a truck having a cargo area with a tailgate, to improve ingress and egress of personnel from the cargo area comprising: a bracket mounted to the tailgate; a stud located on the bracket; a first slotted retention boss located on the bracket a predetermined distance vertically away from the stud; a second slotted retention boss located a predetermined distance horizontally from the stud; a ladder including first and second parallel side rails, and a plurality of rungs attached to and disposed between the side rails; a bearing located on one end of the ladder near the first side rail, the bearing being affixed to and journaled on the stud to rotatably mount one end of the ladder to the bracket and allow rotation of the ladder through an arc; a detent, adapted to engage the retention bosses, mounted on the second side rail on the same end of the ladder as the bearing, the detent engaging the first slotted retention boss to hold the ladder in a storage position parallel to the longitudinal axis of the tailgate when the tailgate is up and adapted to engage the second slotted retention boss to hold the ladder in a deployed position when the tailgate is down; and a handle having first and second parallel arms joined by a semicircular connector, the first parallel arm of the handle being coaxially mounted within the first side rail of the ladder, the first parallel arm being free to move longitudinally with respect to the ladder rail, the second arm having a curved bail attached to the end opposite the semicircular connector, the semicircular connector being directed towards the first ladder side rail, the curved bail having a headed protrusion that engages a slot formed in the first ladder side rail, the slot having an offset depression associated therewith, the offset depression adapted to hold the head of the protrusion when the handle is in its upright position to maintain the handle in position.

* * * * *